United States Patent Office 3,458,510
Patented July 29, 1969

3,458,510
ALPHA PIPERIDYL OR PYRIDYL-ALPHA TERTIARY AMINOMETHYL BENZYL ALCOHOLS
William J. Houlihan, Mountain Lakes, N.J., assignor to Sandoz Inc., Hanover, N.J.
No Drawing. Continuation-in-part of application Ser. No. 511,966, Dec. 6, 1965. This application Apr. 26, 1966, Ser. No. 545,247
Int. Cl. C07d *31/40, 87/28, 99/02*
U.S. Cl. 260—247.5          6 Claims

ABSTRACT OF THE DISCLOSURE

Benzyl alcohols substituted by a nitrogen containing heterocyclic radical and an amino methyl moiety, such as 4-methoxy-α-2-pyridyl-α-morpholinomethyl benzyl alcohol, are prepared from a phenacylamine and a lithium derivative of pyridine. These compounds are useful as hypoglycemic-antidiabetes agents.

---

This application is a continuation-in-part of my copending application, Ser. No. 511,966, filed Dec. 6, 1965, now abandoned.

This invention relates to derivatives of benzyl alcohol. In particular, the invention pertains to pharmacologically active α-heterocyclic-α-tertiary aminomethyl benzyl alcohols. The invention also relates to intermediates which are useful in preparing the above compounds.

The pharmacologically active compounds of the present invention are of the formulae

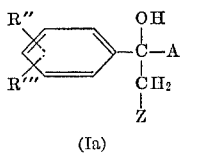  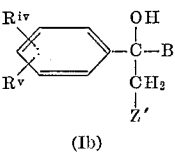

(Ia)          (Ib)

wherein:

A represents

preferably

B represents

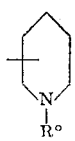

preferably

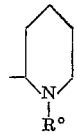

$R^0$ represents hydrogen or methyl;
Z represents

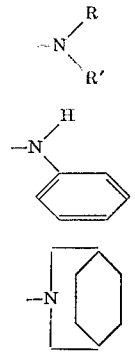

or a saturated monocyclic ring

containing in the ring, in addition to the nitrogen atom, from 4 to 6 carbon atoms or 4 to 5 carbon atoms and one additional hetero atom of the group nitrogen and oxygen, e.g., morpholino, homomorpholino, pyrrolidino, piperidino, hexahydroazepino, 4-lower alkylpiperazino and 4-lower alkylhomopiperazino, the lower alkyl substituent of the last two mentioned groups being straight or branched chain and preferably containing from 1 to 4 carbon atoms;

Z' represents

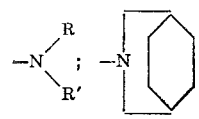

or a saturated monocyclic ring

containing in the ring, in addition to the nitrogen atom, from 4 to 6 carbon atoms or 4 to 5 carbon atoms and one additional hetero atom of the group nitrogen and oxygen, e.g., morpholino, homomorpholino, pyrrolidino, piperidino, hexahydroazepino, 4-lower alkylpiperazino and 4-lower alkylhomopiperazino, the lower alkyl substituent of the last two mentioned groups being straight or branched chain and preferably containing from 1 to 4 carbon atoms;

R represents lower alkyl, straight or branched chain, preferably containing from 1 to 4 carbon atoms, e.g., methyl, ethyl, propyl, isopropyl, butyl and t-butyl;
R' represents lower alkyl, straight or branched chain, preferably containing from 1 to 4 carbon atoms, e.g., methyl, ethyl, propyl, isopropyl, butyl and t-butyl; or unsubstituted cycloalkyl, preferably containing from 5 to 7 carbon atoms, e.g., cyclopentyl, cyclohexyl and cycloheptyl;

R" is in one of the positions 2-, 3-, 4- and 5- and is either hydrogen; straight-chain lower alkyl, preferably containing from 1 to 4 carbon atoms, e.g., methyl, ethyl, propyl and butyl; straight-chain lower alkoxy, preferably containing from 1 to 4 carbon atoms, e.g. methoxy, ethoxy, propoxy and butoxy; halogen having an atomic weight no greater than 80, i.e., fluorine, chlorine or bromine; trifluoromethyl or nitro;

R''' is in one of the available positions 2-, 3-, 4- and 5- and is either hydrogen; straight-chain lower alkyl, preferably containing from 1 to 4 carbon atoms, e.g., methyl, ethyl, propyl and butyl; straight-chain lower alkoxy, preferably containing from 1 to 4 carbon atoms, e.g., methoxy, ethoxy, propoxy and butoxy; halogen having an atomic weight no greater than 80, i.e., fluorine, chlorine or bromine; trifluoromethyl; nitro; or R" together with R''' form a 2,3- or 3,4-methylenedioxy bridge;

$R^{iv}$ is in one of the positions 2-, 3-, 4- and 5- and is either hydrogen; straight-chain lower alkyl, preferably containing from 1 to 4 carbon atoms, e.g., methyl, ethyl, propyl and butyl; straight-chain lower alkoxy, preferably containing from 1 to 4 carbon atoms, e.g., methoxy, ethoxy, propoxy and butoxy; halogen having an atomic weight no greater than 80, i.e., fluorine, chlorine or bromine; trifluoromethyl or amino ($NH_2$);

$R^v$ is in one of the available positions 2-, 3-, 4- and 5- and is either hydrogen; straight-chain lower alkyl, preferably containing from 1 to 4 carbon atoms, e.g., methyl, ethyl, propyl and butyl; straight-chain lower alkoxy, preferably containing from 1 to 4 carbon atoms, e.g., methoxy, ethoxy, propoxy and butoxy; halogen having an atomic weight no greater than 80, i.e., fluorine, chlorine or bromine; trifluoromethyl; amino ($NH_2$); or $R^{iv}$ together with $R^v$ form a 2,3- or 3,4-methylenedioxy bridge.

The compounds of Formula Ia are readily prepared by reacting an appropriate phenacylamine with a lithium derivative of pyridine to form the corresponding α-tertiary aminomethyl-α-pyridyl benzyl alcohol. The compounds of formula Ib are prepared by reduction of the appropriate compounds of Formula Ia. This process is illustrated by the following reaction scheme:

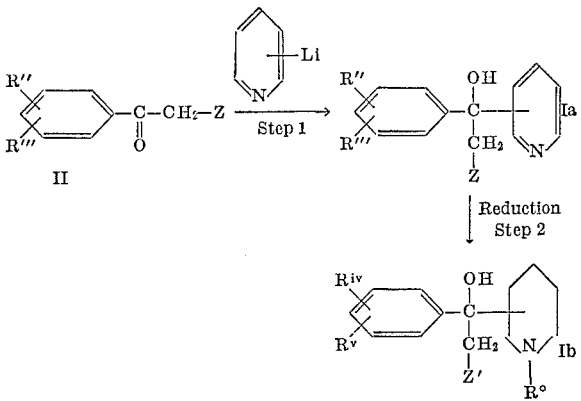

In the above formulae, R°, R", R''', $R^{iv}$, $R^v$, Z and Z' are as previously defined.

In Step 1 of the process a phenacylamine (II) is reacted with a pyridyl lithium compound to form the corresponding pyridyl derivative (Ia). This reaction is carried out in conventional manner employing a suitable inert organic solvent such as an ether, e.g., diethyl ether, dioxane and tetrahydrofuran and a reaction temperature of about —20° C. or below. The resulting pyridyl derivative is readily recovered in conventional manner.

Step 2 of the process involves the formation of the corresponding piperidyl derivative (Ib) via hydrogenation of the pyridyl derivative (Ia). With respect to those compounds of Formula Ib wherein R° is limited to hydrogen, the hydrogenation is preferably effected catalytically employing a suitable solvent and catalyst, preferably acetic acid and a platinum catalyst (e.g., $PtO_2$), and a hydrogen pressure of up to about 50 p.s.i.g. However, such hydrogenation may also be carried out using any of the conventional methods for reducing pyridine to piperidine such as, for example, reduction with sodium and alcohol and electrolytic reduction. As for those compounds of Formula Ib wherein R° is methyl, the hydrogenation is preferably effected catalytically in the presence of formaldehyde and a suitable catalyst, such as palladium/carbon, employing a hydrogen pressure of up to about 50 p.s.i.g. The resulting hydrogenated compounds can be readily recovered in conventional manner.

It will be readily apparent to those in the art that with respect to those compounds of Formula Ia which contain reducible groups in addition to the pyridyl moiety, the reduction effected by Step 2 will also serve to reduce such groups. Thus with respect to those compounds of Formula Ia which contain one or two nitro groups in the benzene moiety, the reduction of such compounds will yield the corresponding piperidyl derivatives of Formula Ib which are substituted in the benzene nucleus with one or two amino groups, respectively. Similarly, the reduction of those compounds of Formula Ia wherein Z is phenylamino will yield the corresponding piperidyl derivative wherein Z' is cyclohexylamino.

Various of the starting compounds employed in Step 1 of the above process are known and can be prepared by methods described in the literature. Such others which may not be specifically known can be prepared in analogous manner from either known compounds or compounds which can be prepared by known procedures from available compounds. In general, such compounds are prepared by brominating acetophenone or an appropriately substituted derivative thereof to form the corresponding 2-bromoacetophenone and then reacting the latter with an appropriate amine. This process is illustrated below.

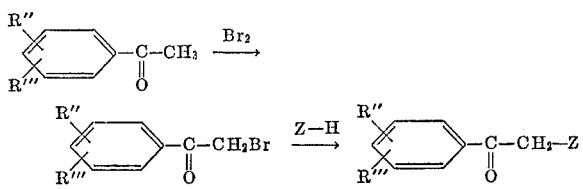

The bromination is carried out in an inert organic solvent, e.g., carbon tetrachloride, chloroform and methylene chloride, and at room temperature or below. Similarly, the reaction with the amine is carried out in an inert organic solvent, e.g., diethyl ether, dioxane, tetrahydrofuran, toluene, methylene chloride and carbon tetrachloride, and at room temperature or below.

The pyridyl lithium reactant employed in Step 1 of the process can be prepared by reaction of an appropriate bromopyridine with butyl lithium in conventional manner.

The compounds of Formulas Ia and Ib exist in racemic form or in the form of optically active isomers. The separation and recovery of the respective isomers may be readily accomplished employing conventional techniques and such isomers are included within the scope of this invention.

The compounds of Formulas Ia and Ib are useful because they possess pharmacological activity. In particular, the compounds are useful as hypoglycemic-antidiabetes agents. For the above uses the compounds may be combined with a conventional pharmaceutical carrier, and other adjuvants, if necessary, and administered orally in such forms as tablets, capsules, elixirs, suspensions and solutions or parenterally in such forms as injectable solutions, suspensions and emulsions. Furthermore, the compounds may be similarly administered in the form of their non-toxic, pharmaceutically acceptable acid addition or quaternary salts. Such salts do not materially differ from the free base in their pharmacological effects, and are included within the scope of the invention. Representative of the acid addition salts are the mineral acid salts such as the hydrochloride, hydrobromide, sulfate, phosphate and the like and the organic acid salts such as the succinate, benzoate, acetate, maleate, p-toluenesulfonate, benzenesulfonate and the like. Exemplary of the quaternary salts are those derived from common quaternizing agents such as straight-chain lower alkyl halides, preferably containing from 1 to 4 carbon atoms, e.g., methylbromide, ethylbromide, methyliodide and ethyl-iodide, and straight-chain di-(lower)alkyl sulfates (each of the lower alkyl substituents preferably containing from 1 to 4 carbon atoms), e.g., dimethyl sulfate. Such salts are readily prepared from the free base by reacting the base with pharmacologically acceptable acids or quaternizing agents in conventional manner.

The compounds of Formula Ib are generally more active than the corresponding compounds of Formula Ia and therefore represent the preferred active compounds of this invention. However, the latter compounds are nevertheless active and may be used in the manner described above. Alternatively, such compounds can be utilized as intermediates for the preparation of the preferred active compounds of the instant invention.

Furthermore, as noted above, the compounds of Formulas Ia and Ib exist as optical isomers. In some cases greater pharmacological activity or other beneficial attribute may be found for a particular isomer and in such instances the administration of such isomer may be preferred.

For the above mentioned uses, the dosage administered will, of course, vary depending on the compound employed, mode of administration and treatment intended. However, in general, satisfactory results are obtained when administered at a daily dosage of from about 50 milligrams to about 500 milligrams.

A representative formulation of the present invention is a tablet prepared by conventional tabletting techniques containing the following ingreidents:

| Ingredient: | Parts by weight |
| --- | --- |
| α-2-piperidyl-α-morpholinomethyl benzyl alcohol (or a pharmaceutically acceptable salt thereof) | [1] 67 |
| Tragacanth | 2 |
| Lactose | 22.5 |
| Corn starch | 5 |
| Talcum | 3 |
| Magnesium stearate | 0.5 |

[1] Calculated as free base.

The following examples show representative compounds contemplated by this invention and the manner in which such compounds are made. However, it is to be understood that these examples are intended for purposes of illustration only and are not intended as in any way limiting the scope of the invention which is defined in the appended claims. In the examples all temperatures are in degrees centigrade and parts and percentages are by weight unless otherwise specified. The relationship between parts by weight and parts by volume is the same as that between the kilogram and the liter.

EXAMPLE 1

α-2-pyridyl-α-morpholinomethyl benzyl alcohol

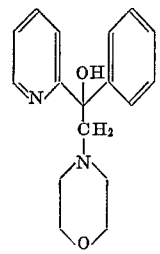

A. Preparation of N-phenacylmorpholine.—Charge a four-necked flask with 130 parts (1.5 mole) of morpholine, and then add thereto a solution of 99.5 parts (0.5 mole) of 2-bromoacetophenone in 750 parts by volume of toluene at a low enough rate to preclude the internal temperature from exceeding 30°. Stir the thus-obtained reaction mixture overnight at room temperature. Thereafter filter off any precipitated salt, and concentrate the filtrate in vacuo on a rotary evaporator. There is thus obtained N-phenacylmorpholine as a liquid having a boiling point (B.P.) of 146° to 151° at 0.2 mm. On standing the compound solidifies.

B. Preparation of α-2 - pyridyl-α-morpholinomethyl benzyl alcohol.—Charge a four-necked flask (equipped with a stirrer, thermometer, dropping funnel, condenser and nitrogen inlet) with 250 parts by volume of absolute diethyl ether and 130 parts by volume of a 15% solution of n-BuLi (0.3 mole) in hexane. Cool (with stirring) the resulting solution to —50°, and then add dropwise thereto a solution of 39.5 parts (0.25 mole) of 2-bromopyridine in 125 parts by volume of absolute diethyl ether at a sufficiently low rate to preclude the internal temperature from exceeding —50°. Stir the resultant an additional 15 minutes before adding dropwise thereto a solution of 40 parts (0.195 mole) of N-phenacylmorpholine in 125 parts by volume of absolute diethyl ether at such a rate that the internal temperature is maintained at —50°±10°. Afer completing the latter addition, stir for an additional hour before removing the cooling system.

When the temperature of the thus-obtained reaction mixture reaches 0°, add thereto 375 parts by volume of 1.5 N hydrochloric acid at a low enough rate that the temperature may be maintained at from 0° to 10°. After this addition separate the organic layer from the aqueous layer; wash the organic layer twice with 2 N hydrochloric acid. Wash the combined acid layers with diethyl ether; cool the thus-washed acidic material to 10° and add thereto 2 N sodium hydroxide until the resultant is basic. Extract the resulting basic material with chloroform before drying same over sodium sulfate and then removing the solvent in vacuo on a rotary evaporator. The resultant oil is crystallized from methanol/water to yield α-2-pyridyl-α-morpholinomethyl benzyl alcohol, M.P. 79° to 80°.

To prepare the methyl iodide quaternary ammonium salt of the base, reflux a solution of 2.84 parts of the base, 5 parts by volume in methyl iodide and 75 parts by volume of acetone for 16 hours with stirring. Concentrate the refluxed solution on a rotary evaporator and crystallize the solid material thus obtained from ethanol-ether to obtain the methyl iodide salt of α-pyridyl-α-morpholinomethyl benzyl alcohol, M.P. 209° to 211°.

EXAMPLE 2

3-(2-hydroxy-2-phenyl-2-α-pyridylethyl)-3-azabicyclo[3.2.2]nonane

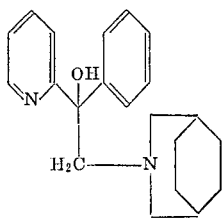

A. Preparation of 3 - phenacyl - 3 - azabicyclo[3.2.2]nonane.—Charge a four-necked flask with 125 parts (1.0 mole) of 3-azabicyclo[3.2.2]nonane, and then add thereto a solution of 99.5 parts (0.5 mole) of 2-bromoacetophenone in 800 parts by volume of methylene chloride at a low enough rate to preclude the internal temperature from exceeding 30°. Stir the thus-obtained reaction mixture overnight at room temperature. Thereafter filter off any precipitated salt, and concentrate the filtrate in vacuo on a rotary evaporator to yield 3-phenyacyl-3-azabicyclo [3.2.2]nonane as an oil.

B. Preparation of 3 - (2 - hydroxy-2-phenyl-2-α-pyridylethyl)-3-azabicyclo[3.2.2]-nonane.—Charge a four-necked flask (equipped with a stirrer, thermometer, dropping funnel, condenser and nitrogen inlet) with 250 parts by volume of absolute diethyl ether and 130 parts by volume of a 15% solution of n-BuLi (0.3 mole) in hexane. Cool (with stirring) the resulting solution to —50°, and then add dropwise thereto a solution of 39.5 parts (0.25 mole) of 2-bromopyridine in 125 parts by volume of absolute diethyl ether at a sufficiently low rate to preclude the internal temperature from exceeding —50°. Stir the resultant an additional 15 minutes before adding dropwise thereto a solution of 48.6 parts (0.2 mole) of 3-phenacyl-3-azabicyclo [3.2.2]nonane in 250 parts by volume of absolute diethyl ether at such a rate that the internal temperature is maintained at —50°±10°. After completing the latter addition, stir for an additional hour before removing the cooling system.

When the temperature of the thus-obtained reaction mixture reaches 0°, add thereto 375 parts by volume of 1.5 N hydrochloric acid at a low enough rate that the temperature may be maintained at from 0° to 10°. After this addition separate the organic layer from the aqueous layer; wash the organic layer twice with 2 N hydrochloric acid. Wash the combined acid layers with diethyl ether; cool the thus-washed acidic material to 10° and add thereto 2 N sodium hydroxide until the resultant is basic. Extract the resulting basic material with chloroform before drying same over sodium sulfate and then removing the solvent in vacuo on a rotary evaporator. The residue is crystallized from methanol to yield 3 - (2 - hydroxy-2-phenyl - 2 - α-pyridylethyl)-3-azabicyclo[3·2·2]nonane, M.P. 103° to 104°.

EXAMPLE 3

4-chloro-α-2-pyridyl-α-morpholinomethyl benzyl alcohol

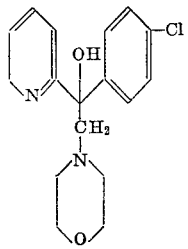

A. Preparation of N-(4-chlorophenacyl)morpholine.—Charge a four-necked flask with 68 parts (0.78 mole) of morpholine and then add thereto a solution of 91 parts (0.39 mole) of 2-bromo-4'-chloracetophenone in 650 parts by volume of toluene sufficiently slowly that the internal temperature does not exceed 30°. Stir the thus-obtained reaction mixture overnight at room temperature. Thereafter filter off the precipitated salt, and concentrate the filtrate in vacuo on a rotary evaporator. Crystallize the thus-obtained crude material from methanol/water to obtain N-(4-chlorophenacyl)morpholine, M.P. 74° to 76°.

B. Preparation of 4-chloro-α-2-pyridyl-α-morpholinomethyl benzyl alcohol.—Charge a four-necked flask (equipped with a stirrer, thermometer, dropping funnel, condenser and nitrogen inlet) with 125 parts by volume of absolute diethylether and 65 parts by volume of a 15% solution of n-BuLi (0.15 mole) in hexane. Cool (with stirring) the resulting solution to —50°, and then add dropwise thereto a solution of 19.75 parts (0.125 mole) of 2-bromopyridine in 65 parts by volume of absolute diethyl ether at a sufficiently low rate to preclude the internal temperature from exceeding —50°. Stir the resultant an additional 15 minutes before adding dropwise thereto a solution of 20 parts (0.084 mole) of N-(4-chlorophenacyl)-morpholine in 350 parts by volume of absolute diethyl ether at such a rate that the internal temperature is maintained at —50°±10°. After completing the latter addition, stir for an additional hour before removing the cooling system.

When the temperature of the thus-obtained reaction mixture reaches 0°, add thereto 375 parts by volume of 1.5 N hydrochloric acid at a low enough rate that the temperature may be maintained at from 0° to 10°. After this addition separate the organic layer from the aqueous layer; wash the organic layer twice with 2 N hydrochloric acid. Wash the combined acid layers with diethyl ether; cool the thus-washed acidic material to 10° and add thereto 2 N sodium hydroxide until the resultant is basic. Extract the resulting basic material with chloroform before drying same over sodium sulfate and then removing the solvent in vacuo on a rotary evaporator. The resultant oil is 4-chloro-α-2-pyridyl-α-morpholinomethyl benzyl alcohol.

EXAMPLE 4

α-2-piperidyl-α-morpholinomethyl benzyl alcohol

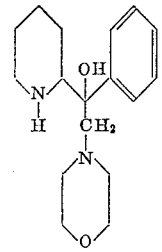

Charge a hydrogenation bottle with 11.3 parts (0.04 mole) of α-2-pyridyl-α-morpholinomethyl benzyl alcohol, 150 parts by volume of acetic acid and 0.4 part of platinum oxide. Place the bottle in a Parr hydrogenation apparatus and adjust the hydrogen pressure to 50 pounds per square inch (p.s.i.g.). When the theoretical amount of hydrogen is absorbed (about 3.5 hours), filter off the catalyst and evaporate the filtrate on a rotary evaporator. Add 20% (aq.) potassium hydroxide solution to the resulting residue until it is basic to litmus. Extract the thus-obtained mixture with chloroform, and remove chloroform from the extract on a rotary evaporator.

The resulting free base is α-2-piperidyl-α-morpholinomethyl benzyl alcohol. Dissolve the said free base in diethyl ether, cool the ether solution to 10°, and pass through said cooled solution a stream of hydrogen chloride gas. Filter off precipitated salt and crystallize same from methanol to obtain the α-2-piperidyl-α-morpholinomethyl benzyl alcohol dihydrochloride as a white solid, M.P. 297° to 298°.

To prepare the methyl iodide quaternary ammonium salt of the base, admix 1.5 parts of the base and 5 parts by volume of methyl iodide in 50 parts by volume of acetone. Stir the resulting solution at room temperature for about 16 hours and then add diethyl ether until the solution becomes cloudy. Filter off the crystals that precipitate out to obtain the methyl iodide salt of α-2-piperidyl-α-morpholinomethyl benzyl alcohol, M.P. 209° to 211°.

EXAMPLE 5

4-chloro-α-2-piperidyl-α-morpholinomethyl benzyl alcohol

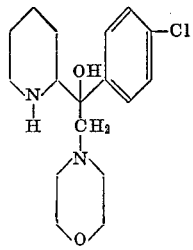

Charge a hydrogenation bottle with 20.1 parts (0.063 mole) of 4 - chloro - α - 2 - pyridyl - α - morpholinomethyl benzyl alcohol, 150 parts by volume of acetic acid and 0.6 part of platinum oxide. Place the bottle in a Parr hydrogenation apparatus and adjust the hydrogen pressure to 50 pounds per square inch (p.s.i.g.). When the theoretical amount of hydrogen is absorbed (about 3.5 hours), filter off the catalyst and evaporate the filtrate on a rotary evaporator. Add 20% (aq.) potassium hydroxide solution to the resulting residue until it is basic to litmus. Extract the thus-obtained mixture with chloroform, and remove chloroform from the extract on a rotary evaporator.

The resulting free base is 4-chloro-α-2-piperidyl-α-morpholinomethyl benzyl alcohol. Dissolve said free base in diethyl ether, cool the ether solution to 10°, and pass through said cooled solution a stream of hydrogen chloride gas. Filter off precipitated salt and crystallize same from methanol to obtain 4-chloro-2-α-piperidyl-α-morpholinomethyl benzyl alcohol dihydrochloride, M.P. 295° to 297°.

EXAMPLE 6

3-(2-hydroxy-2-phenyl-2-α-piperidylethyl)-3-azabicyclo[3.2.2]nonane

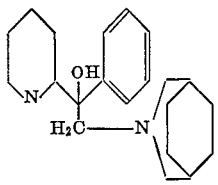

Charge a hydrogenation bottle with 4.5 parts (0.014 mole) of 3-(2-hydroxy-2-phenyl-2-α-pyridylethyl)-3-azabicyclo[3.2.2]nonane, 75 parts by volume of acetic acid and 0.15 part of platinum oxide. Place the bottle in a Parr hydrogenation apparatus and adjust the hydrogen pressure to 50 pounds per square inch (p.s.i.g.). When the theoretical amount of hydrogen is absorbed (about 3.5 hours), filter off the catalyst and evaporate the filtrate on a rotary evaporator. Add 20% (aq.) potassium hydroxide solution to the resulting residue until it is basic to litmus. Extract the thus-obtained mixture with chloroform, and remove chloroform from the extract on a rotary evaporator.

The resulting free base is 3-(2-hydroxy-2-phenyl-2-α-piperidylethyl)-3-azabicyclo[3.2.2]nonane. Dissolve said free base in diethyl ether, cool the ether solution to 10°, and pass through said cooled solution a stream of hydrogen chloride gas. Filter off precipitated salt and crystallize same from methanol to obtain 3-(2-hydroxy-2-phenyl-2-α-piperidylethyl)-3-azabicyclo[3.2.2]nonane dihydrochloride, M.P. 276° to 278°.

EXAMPLE 7

4-methyl-α-2-pyridyl-α-morpholinomethyl benzyl alcohol

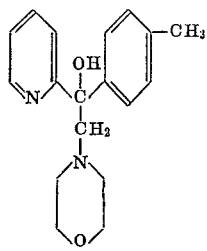

A. Preparation of N-(4-methylphenacyl)morpholine.—Add a solution of 22.9 parts by volume (0.45 mole) of bromine in 250 parts by volume of carbon tetrachloride dropwise to a solution of 67 parts (0.5 mole) of 4'-methylacetophenone in 250 parts by volume of carbon tetrachloride at a slow enough rate to assure having the bromine color fade rapidly. After the addition is complete, cool the resultant in an ice bath. Thereafter, add a solution of 174 parts (2.0 moles) of morpholine in 500 parts by volume of carbon tetrachloride to the thus-cooled material.

Stir the obtained mixture overnight (17 hours) at room temperature. Filter off precipitated salt, and concentrate the filtrate in vacuo on a rotary evaporator to obtain an oil. Dissolve the oil in diethyl ether, and extract the resulting solution three times the 2 N hydrochloric acid. Cool the acid extract to 10° and make the cooled extract alkaline with solid sodium carbonate. Extract the thus-produced alkaline material with methylene chloride; dry the methylene chloride extract with sodium sulfate; and filter the thus-dried extract. Remove methylene chloride from said extract in vacuo in a rotary evaporator to obtain a residue. Crystallize the residue from chloroform/pentane to obtain N-(4-methylphenacyl)-morpholine, melting point (M.P.) 84° to 88°.

B. Preparation of 4-methyl-α-2-pyridyl-α-morpholinomethyl benzyl alcohol.—Charge a four-necked flask (equipped with a stirrer, thermometer, dropping funnel, condenser and nitrogen inlet) with 5.9 parts lithium, 54.8 parts n-butyl bromide and 450 parts by volume of absolute diethyl ether. Cool (with stirring) the resulting solution to —50°, and then add dropwise thereto a solution of 55 parts of 2-bromopyridine in 100 parts by volume of absolute diethyl ether at a sufficiently low rate to preclude the internal temperature from exceeding —50°. Stir the resultant an additional 15 minutes before adding dropwise thereto a solution of 21.9 parts of N-(4-methylphenacyl)morpholine in 500 parts by volume of absolute diethyl ether at such a rate that the internal temperature is maintained at —50°±10°. After completing the latter addition, stir for an additional hour before removing the cooling system.

When the temperature of the thus-obtained reaction mixture reaches 0°, add thereto 150 parts by volume of water and 80 parts by volume of acetic acid at a low enough rate that the temperature may be maintained at from 0° to 10°. After the addition is completed, separate the organic layer from the aqueous layer; wash the organic layer twice with 2 N hydrochloric acid. Wash the combined acid layers with diethyl ether; cool the thus washed acidic material to 10° and add thereto 2 N sodium hydroxide until the resultant is basic. Extract the resulting basic material with chloroform before drying same over sodium sulfate and then removing the solvent in vacuo on a rotary evaporator. Chromatograph the resulting oil through silica gel to obtain 4-methyl-α-2-pyridyl-α-morpholinomethyl benzyl alcohol, M.P. 85° to 87°.

EXAMPLE 8

4-nitro-α-2-pyridyl-α-morpholinomethyl benzyl alcohol

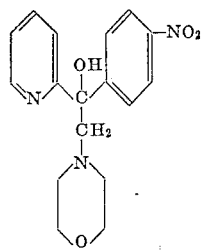

Charge a four-necked flask (equipped with a stirrer, thermometer, dropping funnel, condenser and nitrogen inlet) with 4.5 parts lithium, 41.6 parts n-butyl bromide and 350 parts by volume of absolute diethyl ether. Cool (with stirring) the resulting solution to −50°, and then add dropwise thereto a solution of 42 parts of 2-bromopyridine in 100 parts by volume of absolute diethyl ether at a sufficiently low rate to preclude the internal temperature from exceeding −50°. Stir the resultant an additional 15 minutes before adding dropwise thereto a solution of 19.0 parts of N-(4-nitrophenacyl)morpholine in 500 parts by volume of tetrahydrofuran at such a rate that the internal temperature is maintained at −50°±10°. After completing the latter addition, stir for an additional hour before removing the cooling system.

When the temperature of the thus-obtained reaction mixture reaches 0°, add thereto 150 parts by volume of water and 80 parts by volume of acetic acid at a low enough rate that the temperature may be maintained from 0° to 10°. After the addition is completed, separate the organic layer from the aqueous layer; wash the organic layer twice with 2 N hydrochloric acid. Wash the combined acid layers with diethyl ether; cool the thus washed acidic material to 10° and add thereto 2 N sodium hydroxide until the resultant is basic. Extract the resulting basic material with chloroform before drying same over sodium sulfate and then removing the solvent in vacuo on a rotary evaporator. Chromatograph the resulting oil through silica gel to obtain 4-nitro-α-2-pyridyl-α-morpholinomethyl benzyl alcohol as an oil.

EXAMPLE 9

α-2-pyridyl-α-piperidinomethyl benzyl alcohol

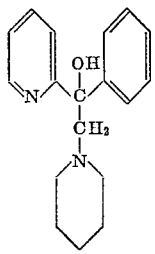

Charge a four-necked flask (equipped with a stirrer, thermometer, dropping funnel, condense rand nitrogen inlet) with 5.86 parts lithium, 54.8 parts n-butyl bromide and 300 parts by volume of absolute diethyl ether. Cool (with stirring) the resulting solution to −50°, and then add dropwise thereto a solution of 55.3 parts of 2-bromopyridine in 75 parts by volume of absolute diethyl ether at a sufficiently low rate to preclude the internal temperature from exceeding −50°. Stir the resultant an additional 15 minutes before adding dropwise thereto a solution of 20.3 parts of N-phenacylpiperidine at such a rate that the internal temperature is maintained at −50°±10°. After completing the latter addition, stir for an additional hour before removing the cooling system.

When the temperature of the thus obtained reaction mixture reaches 0°, add thereto 125 parts by volume of water and 125 parts by volume of 2 N hydrochloric acid at a low enough rate that the temperature may be maintained at from 0° to 10°. After the addition is completed, separate the organic layer from the aqueous layer; wash the organic layer twice with 2 N hydrochloric acid. Wash the combined acid layers with diethyl ether; cool the thus washed acidic material to 10° and add thereto 2 N sodium hydroxide until the resultant is basic. Extract the resulting basic material with chloroform before drying same over sodium sulfate and then removing the solvent in vacuo on a rotary evaporator. Chromatograph the resulting oil through silica gel to obtain α-2-pyridyl-α-piperidinomethyl benzyl alcohol as an oil.

EXAMPLE 10

4-methyl-α-2-pyridyl-α-N-methylanilinomethyl benzyl alcohol

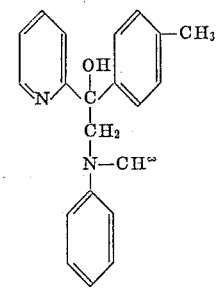

Charge a four-necked flask (equipped with a stirrer, thermometer, dropping funnel, condenser and nitrogen inlet) with 5.86 parts lithium, 54.8 parts n-butyl bromide and 450 parts by volume of absolute diethyl ether. Cool (with stirring) the resulting solution to −50°, and then add dropwise thereto a solution of 55.3 parts of 2-bromopyridine in 75 parts by volume of absolute diethyl ether at a sufficiently low rate to preclude the internal temperature from exceeding −50°. Stir the resultant an additional 15 minutes before adding dropwise thereto a solution of 23.9 parts of N-methyl-N-(4-methylphenacyl)aniline in 350 parts by volume of absolute diethyl ether at such a rate that the internal temperature is maintain at −50°±10°. After completing the latter addition, stir for an additional hour before removing the cooling system.

When the temperature of the thus-obtained reaction mixture reaches 0°, add thereto 125 parts by volume of water and 125 parts by volume of 2 N hydrochloric acid at a low enough rate that the temperature may be maintained at from 0° to 10°. After the addition is completed, separate the organic layer from the aqueous layer; wash the organic layer twice with 2 N hydrochloric acid. Wash the combined acid layers with diethyl ether; cool the thus washed acidic material to 10° and add thereto 2 N sodium hydroxide until the resultant is basic. Extract the resulting basic material with chloroform before drying same over sodium sulfate and then removing the solvent in vacuo on a rotary evaporator. Chromatograph the resulting oil through silica gel to obtain 4-methyl-α-2-pyridyl-α-N-methylanilinomethyl benzyl alcohol as an oil.

EXAMPLE 11

4-fluoro-α-2-pyridyl-α-morpholinomethyl benzyl alcohol

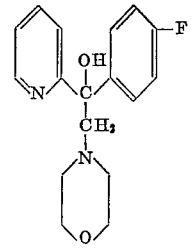

Charge a four-necked flask (equipped with a stirrer, thermometer, dropping funnel, condenser and nitrogen inlet) with 140 parts by volume of absolute diethyl ether and 260 parts by volume of a 15% solution of n-butyl lithium in hexane. Cool (with stirring) the resulting solution to —50°, and then add dropwise thereto a solution of 83 parts of 2-bromopyridine in 110 parts by volume of absolute diethyl ether at a sufficiently low rate to preclude the internal temperature from exceeding —50°. Stir the resultant an additional 15 minutes before adding thereto a solution of 33.5 parts of N-(4-fluorophenacyl) morpholine in 150 parts by volume of absolute diethyl ether at such a rate that the internal temperature is maintained at —50°±10°. After completing the latter addition, stir for an additional hour before removing the cooling system.

When the temperature of the thus-obtained reaction mixture reaches 0°, add thereto 500 parts by volume of 2 N hydrochloric acid and 250 parts by volume of water at a low enough rate that the temperature may be maintained at from 0° to 10°. After the addition is completed, separate the organic layer from the aqueous layer; wash the organic layer twice with 2 N hydrochloric acid. Wash the combined acid layers with diethyl ether; cool the thus-washed acidic material to 10° and add thereto 2 N sodium hydroxide until the resultant is basic. Extract the resulting basic material with chloroform before drying the same over sodium sulfate and then removing the solvent in vacuo on a rotary evaporator. Chromatograph the resulting oil through silica gel to obtain 4-fluoro-α-2-pyridyl-α-morpholinomethyl benzyl alcohol as an oil.

EXAMPLE 12

4-methoxy-α-2-pyridyl-α-morpholinomethyl benzyl alcohol

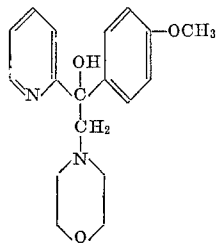

Charge a four-necked flask (equipped with a stirrer, thermometer, dropping funnel, condenser and nitrogen inlet) with 140 parts by volume of absolute diethyl ether and 260 parts by volume of a 15% solution of n-butyl lithium in hexane. Cool (with stirring) the resulting solution to —50°, and then add dropwise thereto a solution of 83 parts of 2-bromopyridine in 110 parts by volume of absolute diethyl ether at a sufficiently low rate to preclude the internal temperature from exceeding —50°. Stir the resultant an additional 15 minutes before adding thereto a solution of 35.3 parts of N-(4-methoxyphenacyl) morpholine in 350 parts by volume of absolute diethyl ether at such a rate that the internal temperature is maintained at —50°±10°. After completing the latter addition, stir for an additional hour before removing the cooling system.

When the temperature of the thus-obtained reaction mixture reaches 0°, add thereto 500 parts by volume of 2 N hydrochloric acid and 250 parts by volume of water at a low enough rate that the temperature may be maintained at from 0° to 10°. After the addition is completed, separate the organic layer from the aqueous layer; wash the organic layer twice with 2 N hydrochloric acid. Wash the combined acid layers with diethyl ether; cool the thus-washed acidic material to 10° and add thereto 2 N sodium hydroxide until the resultant is basic. Extract the resulting basic material with chloroform before drying the same over sodium sulfate and then removing the solvent in vacuo on a rotary evaporator. Chromatograph the resulting oil through silica gel to obtain 4-methoxy-α-2-pyridyl-α-morpholinomethyl benzyl alcohol as an oil.

EXAMPLE 13

α-2-pyridyl-α-N-methylpiperazinomethyl benzyl alcohol

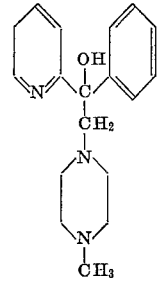

Charge a four-necked flask (equipped with a stirrer, thermometer, dropping funnel, condenser and nitrogen inlet) with 100 parts by volume of absolute diethyl ether and 174 parts by volume of a 15% solution of n-butyl lithium in hexane. Cool (with stirring) the resulting solution to —50°, and then add dropwise thereto a solution of 56 parts of 2-bromopyridine in 80 parts by volume of absolute diethyl ether at a sufficiently low rate to preclude the internal temperature from exceeding —50°. Stir the resultant an additional 15 minutes before adding thereto a solution of 21.8 parts of N-methyl-N-phenacylpiperazine in 350 parts by volume of absolute diethyl ether at such a rate that the internal temperature is maintained at —50°±10°. After completing the latter addition, stir for an additional hour before removing the cooling system.

When the temperature of the thus-obtained reaction mixture reaches 0°, add thereto 335 parts by volume of 2 N hydrochloric acid and 200 parts by volume of water at a low enough rate that the temperature may be maintained at from 0° to 10°. After the addition is completed, separate the organic layer from the aqueous layer; wash the organic layer twice with 2 N hydrochloric acid. Wash the combined acid layers with diethyl ether; cool the thus-washed acidic material to 10° and add thereto 2 N sodium hydroxide until the resultant is basic. Extract the resulting basic material with chloroform before drying the same over sodium sulfate and then removing the solvent in vacuo on a rotary evaporator. Chromatograph the resulting oil through silica gel to obtain α-2-pyridyl-α-N-methylpiperazinomethyl benzyl alcohol as an oil.

EXAMPLE 14

3-trifluoromethyl-α-2-pyridyl-α-morpholinomethyl benzyl alcohol

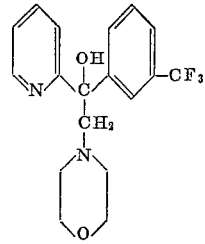

Charge a four-necked flask (equipped with a stirrer, thermometer, dropping funnel, condenser and nitrogen inlet) with 140 parts by volume of absolute diethyl ether and 260 parts by volume of a 15% solution of n-butyl lithium in hexane. Cool (with stirring) the resulting solution to —50°, and then add dropwise thereto a solution of 83 parts of 2-bromopyridine in 110 parts by volume of absolute diethyl ether at a sufficiently low rate to preclude the internal temperature from exceeding —50°. Stir the resultant an additional 15 minutes before adding thereto a solution of 41 parts of N-(3-trifluoromethylphenacyl)morpholine in 150 parts by volume of absolute diethyl ether at such a rate that the internal temperature is maintained at —50°±10°. After completing the latter addition, stir for an additional hour before removing the cooling system.

When the temperature of the thus-obtained reaction mixture reaches 0°, add thereto 500 parts by volume of 2 N hydrochloric acid and 200 parts by volume of water at a low enough rate that the temperature may be maintained at from 0° to 10°. After the addition is completed, separate the organic layer from the aqueous layer; wash the organic layer twice with 2 N hydrochloric acid. Wash the combined acid layers with diethyl ether; cool the thus-washed acidic material to 10° and add thereto 2 N sodium hydroxide until the resultant is basic. Extract the resulting basic material with chloroform before drying the same over sodium sulfate and then removing the solvent in vacuo on a rotary evaporator. Chromatograph the resulting oil through silica gel to obtain 3-trifluoromethyl-α-2-pyridyl-α-morpholinomethyl benzyl alcohol as an oil.

EXAMPLE 15

2,4-dichloro-α-2-pyridyl-α-morpholinomethyl benzyl alcohol.

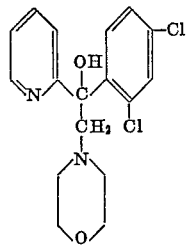

Charge a four-necked flask (equipped with a stirrer, thermometer, dropping funnel, condenser and nitrogen inlet) with 140 parts by volume of absolute diethyl ether and 260 parts by volume of a 15% solution of n-butyl lithium in hexane. Cool (with stirring) the resulting solution to —50°, and then add dropwise thereto a solution of 83 parts of 2-bromopyridine in 110 parts by volume of absolute diethyl ether at a sufficiently low rate to preclude the internal temperature from exceeding —50°. Stir the resultant an additional 15 minutes before adding thereto a solution of 41 parts of N-(2,4-dichlorophenacyl)morpholine in 150 parts by volume of absolute diethyl ether at such a rate that the internal temperature is maintained at —50°±10°. After completing the latter addition, stir for an additional hour before removing the cooling system.

When the temperature of the thus-obtained reaction mixture reaches 0°, add thereto 500 parts by volume of 2 N hydrochloric acid and 200 parts by volume of water at a low enough rate that the temperature may be maintained at from 0° to 10°. After the addition is completed, separate the organic layer from the aqueous layer; wash the organic layer twice with 2 N hydrochloric acid. Wash the combined acid layers with diethyl ether; cool the thus-washed acidic material to 10° and add thereto 2 N sodium hydroxide until the resultant is basic. Extract the resulting basic material with chloroform before drying the same over sodium sulfate and then removing the solvent in vacuo on a rotary evaporator. Chromatograph the resulting oil through silica gel to obtain 2,4 - dichloro - α - 2-pyridyl-α-morpholinomethyl benzyl alcohol as an oil.

EXAMPLE 16

3-chloro-α-2-pyridyl-α-morpholinomethyl benzyl alcohol.

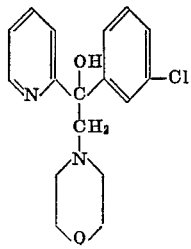

Charge a four-necked flask (equipped with a stirrer, thermometer, dropping funnel, condenser and nitrogen inlet) with 50 parts by volume of absolute diethyl ether and 87 parts by volume of a 15% solution of n-butyl lithium in hexane. Cool (with stirring) the resulting solution to —50°, and then add dropwise thereto a solution of 28 parts of 2-bromopyridine in 40 parts by volume of absolute diethyl ether at a sufficiently low rate to preclude the internal temperature from exceeding —50°. Stir the resultant an additional 15 minutes before adding thereto a solution of 12 parts of N-(3-chlorophenacyl)morpholine in 300 parts by volume of absolute diethyl ether at such a rate that the internal temperature is maintained at —50°±10°. After completing the latter addition, stir for an additional hour before removing the cooling system.

When the temperature of the thus-obtained reaction mixture reaches 0°, add thereto 165 parts by volume of 2 N hydrochloric acid and 100 parts by volume of water at a low enough rate that the temperature may be maintained at from 0° to 10°. After the addition is completed, separate the organic layer from the aqueous layer; wash the organic layer twice with 2 N hydrochloric acid. Wash the combined acid layers with diethyl ether; cool the thus-washed acidic material to 10° and add thereto 2 N sodium hydroxide until the resultant is basic. Extract the resulting basic material with chloroform before drying the same over sodium sulfate and then removing the solvent in vacuo on a rotary evaporator. Chromatograph the resulting oil through silica gel to obtain 3-chloro-α-2-pyridyl-α-morpholinomethyl benzyl alcohol as an oil.

EXAMPLE 17

4-bromo-α-2-pyridyl-α-morpholinomethyl benzyl alcohol.

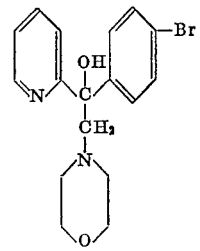

Charge a four-necked flask (equipped with a stirrer, thermometer, dropping funnel, condenser and nitrogen inlet) with 100 parts by volume of absolute diethyl ether and 174 parts by volume of a 15% solution of n-butyl lithium in hexane. Cool (with stirring) the resulting solution to —50°, and then add dropwise thereto a solution of 56 parts of 2-bromopyridine in 80 parts by volume of absolute diethyl ether at a sufficiently low rate to preclude the internal temperature from exceeding —50°. Stir the resultant an additional 15 minutes before adding thereto a solution of 28.4 parts of N-(4-bromophenacyl)morpholine in 600 parts by volume of absolute diethyl ether at such a rate that the internal temperature is maintained at —50°±10°. After completing the latter addition, stir for an additional hour before removing the cooling system.

When the temperature of the thus-obtained reaction mixture reaches 0°, add thereto 335 parts by volume of 2 N hydrochloric acid and 200 parts by volume of water at a low enough rate that the temperature may be maintained at from 0° to 10°. After the addition is completed, separate the organic layer from the aqueous layer; wash the organic layer twice with 2 N hydrochloric acid. Wash the combined acid layers with diethyl ether; cool the thus-washed acidic material to 10° and add thereto 2 N sodium hydroxide until the resultant is basic. Extract the resulting basic material with chloroform before drying the same over sodium sulfate and then removing the solvent in vacuo on a rotary evaporator. Chromatograph the resulting oil through silica gel to obtain 4-bromo-α-2- pyridyl-α-morpholinomethyl benzyl alcohol, M.P. 82° to 84°.

EXAMPLE 18

2,5-dichloro-α-2-pyridyl-α-morpholinomethyl benzyl alcohol

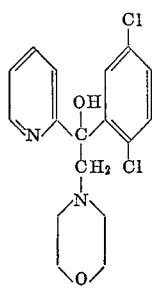

Charge a four-necked flask (equipped with a stirrer, thermometer, dropping funnel, condenser and nitrogen inlet) with 140 parts by volume of absolute diethyl ether and 260 parts by volume of a 15% solution of n-butyl lithium in hexane. Cool (with stirring) the resulting solution to −50°, and then add dropwise thereto a solution of 83 parts of 2-bromopyridine in 110 parts by volume of absolute diethyl ether at a sufficiently low rate to preclude the internal temperature from exceeding −50°. Stir the resultant an additional 15 minutes before adding thereto a solution of 41.2 parts of N-(2,5-dichlorophenacyl)morpholine in 150 parts by volume of absolute diethyl ether at such a rate that the internal temperature is maintained at −50±10°. After completing the latter addition, stir for an additional hour before removing the cooling system.

When the temperature of the thus-obtained reaction mixture reaches 0°, add thereto 500 parts by volume of 2 N hydrochloric acid and 250 parts by volume of water at a low enough rate that the temperature may be maintained at from 0° to 10°. After the addition is completed, separate the organic layer from the aqueous layer; wash the organic layer twice with 2 N hydrochloric acid. Wash the combined acid layers with diethyl ether; cool the thus-washed acidic material to 10° and add thereto 2 N sodium hydroxide until the resultant is basic. Extract the resulting basic material with chloroform before drying the same over sodium sulfate and then removing the solvent in vacuo on a rotary evaporator. Chromatograph the resulting oil through silica gel to obtain 2,5-dichloro-α-2-pyridyl-α-morpholinomethyl benzyl alcohol as an oil.

EXAMPLE 19

3,4-dichloro-α-2-pyridyl-α-morpholinomethyl benzyl alcohol

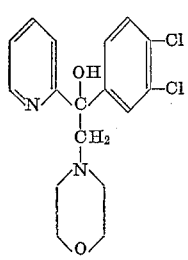

Charge a four-necked flask (equipped with a stirrer, thermometer, dropping funnel, condenser and nitrogen inlet) with 140 parts by volume of absolute diethyl ether and 260 parts by volume of a 15% solution of n-butyl lithium in hexane. Cool (with stirring) the resulting solution to −50°, and then add dropwise thereto a solution of 83 parts of 2-bromopyridine in 110 parts by volume of absolute diethyl ether at a sufficiently low rate to preclude the internal temperature from exceeding −50°. Stir the resultant an additional 15 minutes before adding thereto a solution of 41.2 parts of N-(3,4-dichlorophenacyl)morpholine in 350 parts by volume of absolute diethyl ether at such a rate that the internal temperature is maintained at 50°±10°. After completing the latter addition, stir for an additional hour before removing the cooling system.

When the temperature of the thus-obtained reaction mixture reaches 0°, add thereto 500 parts by volume of 2 N hydrochloric acid and 250 parts by volume of water at a low enough rate that the temperature may be maintained at from 0° to 10°. After the addition is completed, separate the organic layer from the aqueous layer; wash the organic layer twice with 2 N hydrochloric acid. Wash the combined acid layers with diethyl ether; cool the thus-washed acidic material with chloroform before drying the same over sodium sulfate and then removing the solvent in vacuo on a rotary evaporator. Chromatograph the resulting oil through silica gel to obtain 3,4-dichloro-α-2-pyridyl-α-morpholinomethyl benzyl alcohol as an oil.

EXAMPLE 20

4-methyl-α-2-piperidyl-α-morpholinomethyl benzyl alcohol

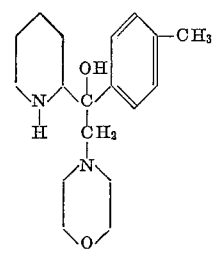

Charge a hydrogenation bottle with 16.3 parts of 4-methyl-α-2-pyridyl - α - morpholinomethyl benzyl alcohol, 100 parts by volume of acetic acid and 0.6 part of platinum oxide. Place the bottle in a Parr hydrogenation apparatus and adjust the hydrogen pressure to 50 p.s.i.g. When the theoretical amount of hydrogen is absorbed (about 16 hours), filter off the catalyst and evaporate the filtrate on a rotary evaporator. Add 20% (aq.) potassium hydroxide solution to the resulting residue until it is basic to litmus. Extract the thus-obtained mixture with chloroform, and remove the chloroform from the extract on a rotary evaporator. Chromatograph the resulting material through silica gel to obtain 4-methyl-α-2-piperidyl-α-morpholinomethyl benzyl alcohol as the free base.

Dissolve the free base in a mixture of diethyl ether and dichloromethane, cool the resulting solution to 0°, and pass through said cooled solution a stream of hydrogen chloride gas to obtain 4-methyl-α-2-piperidyl-α-morpholinomethyl benzyl alcohol dihydrochloride, M.P. 270° to 280°.

EXAMPLE 21

4-amino-α-2-piperidyl-α-morpholinomethyl benzyl alcohol

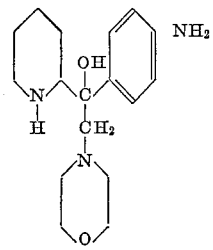

Charge a hydrogenation bottle with 4.6 parts of 4-nitro-α-pyridyl-α-morpholinomethyl benzyl alcohol, 30 parts by volume of acetic acid and 0.5 part of platinum oxide. Place the bottle in a Parr hydrogenation apparatus and adjust the hydrogen pressure to 50 p.s.i.g. When the theoretical amount of hydrogen is absorbed, filter off the catalyst and evaporate the filtrate on a rotary evaporator. Add 20% (aq.) potassium hydroxide solution to the resulting residue until it is basic to litmus. Extract the thus-obtained mixture with chloroform, and remove the chloroform from the extract on a rotary evaporator. Chromatograph the resulting material through silica gel to obtain 4-methyl-α-2-piperidyl-α-morpholinomethyl benzyl alcohol dihydrochloride, M.P. 220° to 230°.

EXAMPLE 22

4-fluoro-α-2-piperidyl-α-morpholinomethyl benzyl alcohol

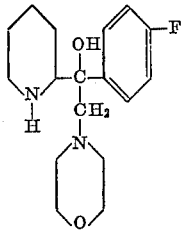

Charge a hydrogenation bottle with 24 parts of 4-fluoro-α-2-pyridyl-α-morpholinomethyl benzyl alcohol, 100 parts by volume of acetic acid and 0.8 part of platinum oxide. Place the bottle in a Parr hydrogenation apparatus and adjust the hydrogen pressure to 50 p.s.i.g. When the theoretical amount of hydrogen is absorbed (about 16 hours), filter off the catalyst and evaporate the filtrate on a rotary evaporator. Add 20% (aq.) potassium hydroxide solution to the resulting residue until it is basic to litmus. Extract the thus-obtained mixture with chloroform, and remove the chloroform from the extract on a rotary evaporator. Chromatograph the resulting material through silica gel to obtain 4-fluoro-α-2-piperidyl-α-morpholinomethyl benzyl alcohol as the free base.

Dissolve the free base in diethyl ether, cool the resulting solution to 0°, and pass through said cooled solution a stream of hydrogen chloride gas. Crystallize the resulting salt from methanol-ether to obtain 4-fluoro-α-2-piperidyl-α-morpholinomethyl benzyl alcohol dihydrochloride, M.P. 292° to 293°.

EXAMPLE 23

4-methoxy-α-2-piperidyl-α-morpholinomethyl benzyl alcohol

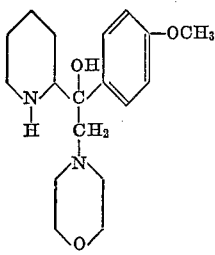

Charge a hydrogenation bottle with 22.0 parts of 4-methoxy-α-2-pyridyl-α-morpholinomethyl benzyl alcohol, 150 parts by volume of acetic acid and 0.7 part of platinum oxide. Place the bottle in a Parr hydrogenation apparatus and adjust the hydrogen pressure to 50 p.s.i.g. When the theoretical amount of hydrogen is absorbed (about 6 hours), filter off the catalyst and evaporate the filtrate on a rotary evaporator. Add 20% (aq.) potassium hydroxide solution to the resulting residue until it is basic to litmus. Extract the thus-obtained mixture with chloroform, and remove the chloroform from the extract on a rotary evaporator. Chromatograph the resulting material through silica gel to obtain 4-methoxy-α-2-piperidyl-α-morpholinomethyl benzyl alcohol as the free base.

Dissolve the free base in diethyl ether, cool the resulting solution to 0°, and pass through said cooled solution a stream of hydrogen chloride gas. Crystallize the resulting salt from methanol-ether to obtain 4-methoxy-α-2-piperidyl-α-morpholinomethyl benzyl alcohol dihydrochloride, M.P. 251° to 253°.

EXAMPLE 24

α-2-piperidyl-α-piperidinomethyl benzyl alcohol

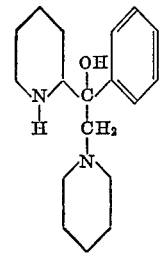

Charge a hydrogenation bottle with 11.3 parts of α-2-pyridyl-α-piperidinomethyl benzyl alcohol, 100 parts by volume of acetic acid and 0.4 part of platinum oxide. Place the bottle in a Parr hydrogenation apparatus and adjust hydrogen pressure to 50 p.s.i.g. When the theoretical amount of hydrogen is absorbed (about 20 hours), filter off the catalyst and evaporate the filtrate on a rotary evaporator. Add 20% (aq.) potassium hydroxide solution to the resulting residue until it is basic to litmus. Extract the thus-obtained mixture with chloroform, and remove the chloroform from the extract on a rotary evaporator. Chromatograph the resulting material through silica gel to obtain α-2-piperidyl-α-piperidinomethyl benzyl alcohol as the free base.

Dissolve the free base in diethyl ether, cool the resulting solution to 0°, and pass through said cooled solution a stream of hydrogen chloride gas. Crystallize the resulting salt from methanol-ether to obtain α-2-piperidyl-α-piperidinomethyl benzyl alcohol dihydrochloride, M.P. 286° to 288°.

EXAMPLE 25

α-2-piperidyl-α-N-methylpiperazinomethyl benzyl alcohol

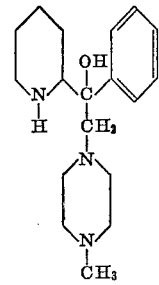

Charge a hydrogenation bottle with 14.85 parts of α-2-pyridyl-α-N-methylpiperazinomethyl benzyl alcohol, 150 parts by volume of acetic acid and 0.5 part of platinum oxide. Place the bottle in a Parr hydrogenation apparatus and adjust the hydrogen pressure to 50 p.s.i.g. When the theoretical amount of hydrogen is absorbed (about 16 hours), filter off the catalyst and evaporate the filtrate on a rotary evaporator. Add 20% (aq.) potassium hydroxide solution to the resulting residue until it is basic to litmus. Extract the thus-obtained mixture with chloroform, and remove the chloroform from the extract on a rotary evaporator. Chromatograph the resulting material through silica gel to obtain α-2-piperidyl-α-N-methylpiperazinomethyl benzyl alcohol as the free base.

Dissolve the free base in diethyl ether, cool the resulting solution to 0°, and pass through said cooled solution a stream of hydrogen chloride gas. Crystallize the resulting salt from methanol-ether to obtain α-2-piperidyl-α-N-methylpiperazinomethyl benzyl alcohol trihydrochloride, M.P 252° to 254°.

EXAMPLE 26

3-trifluoromethyl-α-2-piperidyl-α-morpholinomethyl benzyl alcohol

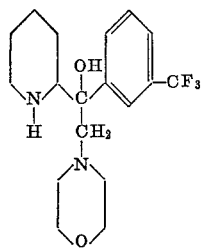

Charge a hydrogenation bottle with 19.7 parts of 3-trifluoromethyl-α-2-pyridyl-α-morpholinomethyl benzyl alcohol, 100 parts by volume of acetic acid and 0.55 part of platinum oxide. Place the bottle in a Parr hydrogenation apparatus and adjust the hydrogen pressure to 50 p.s.i.g. When the theoretical amount of hydrogen is absorbed (about 16 hours), filter off the catalyst and evaporate the filtrate on a rotary evaporator. Add 20% (aq.) potassium hydroxide solution to the resulting residue until it is basic to litmus. Extract the thus-obtained mixture with chloroform, and remove the chloroform from the extract on a rotary evaporator. Chromatograph the resulting material through silica gel to obtain 3-trifluoromethyl-α-2-piperidyl-α-morpholinomethyl benzyl alcohol as the free base.

Dissolve the free base in diethyl ether, cool the resulting solution to 0°, and pass through said cooled solution a stream of hydrogen chloride gas. Crystallize the resulting salt from methanol-ether to obtain 3-trifluoromethyl-α-2-piperidyl-α-morpholinomethyl benzyl alcohol dihydrochloride, M.P. 257° to 258°.

EXAMPLE 27

2,4-dichloro-α-2-piperidyl-α-morpholinomethyl benzyl alcohol

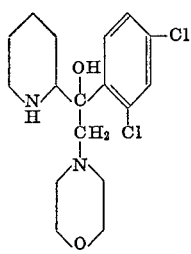

Charge a hydrogenation bottle with 18.0 parts of 2,4-dichloro-α-2-pyridyl-α-morpholinomethyl benzyl alcohol, 100 parts by volume of acetic acid and 0.5 part of platinum oxide. Place the bottle in a Parr hydrogenation apparatus and adjust the hydrogen pressure to 50 p.s.i.g. When the theoretical amount of hydrogen is absorbed (about 12 hours), filter off the catalyst and evaporate the fitrate on a rotary evaporator. Add 20% (aq.) potassium hydroxide solution to the resulting residue until it is basic to litmus. Extract the thus-obtained mixture with chloroform, and remove the chloroform from the extract on a rotary evaporator. Chromatograph the resulting material through silica gel to obtain 2,4-dichloro-α-2-piperidyl-α-morpholinomethyl benzyl alcohol as the free base.

Dissolve the free base in diethyl ether, cool the resulting solution to 0°, and pass through said cooled solution a stream of hydrogen chloride gas. Crystallize the resulting salts from methanol-ether to obtain 2,4-dichloro-α-2-piperidyl-α-morpholinomethyl benzyl alcohol dihydrochloride, M.P. 242° to 243°.

EXAMPLE 28

3-chloro-α-2-piperidyl-α-morpholinomethyl benzyl alcohol

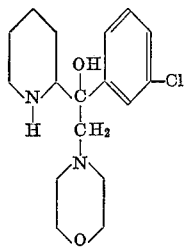

Charge a hydrogenation bottle with 6.37 parts of 3-chloro-α-2-pyridyl-α-morpholinomethyl benzyl alcohol, 100 parts by volume of acetic acid and 0.2 part of platinum oxide. Place the bottle in a Parr hydrogenation apparatus and adjust the hydrogen pressure to 50 p.s.i.g. When the theoretical amount of hydrogen is absorbed (about 16 hours), filter off the catalyst and evaporate the filtrate on a rotary evaporator. Add 20% (aq.) potassium hydroxide solution to the resulting residue until it is basic to litmus. Extract the thus-obtained mixture with chloroform, and remove the chloroform form the extract on a rotary evaporator. Chromatograph the resulting material through silica gel to obtain 3-chloro-α-2-piperidyl-α-morpholinomethyl benzyl alcohol as the free base.

Dissolve the free base in diethyl ether, cool the resulting solution to 0°, and pass through said cooled solution ing salt from methanol-ether to obtain 3-chloro-α-2-piperidyl-α-morpholinomethyl benzyl alcohol dihydrochloride, M.P. 256° to 258°.

EXAMPLE 29

4-bromo-α-2-piperidyl-α-morpholinomethyl benzyl alcohol

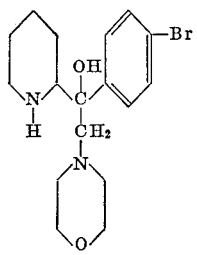

Charge a hydrogenation bottle with 18.15 parts of 4-bromo-α-2-pyridyl-α-morpholinomethyl benzyl alcohol, 200 parts by volume of acetic acid and 0.5 parts of platinum oxide. Place the bottle in a Parr hydrogenation apparatus and adjust the hydrogen pressure to 50 p.s.i.g. When the theoretical amount of hydrogen is absorbed (about 5½ hours), filter off the catalyst and evaporate the filtrate on a rotary evaporator. Add 20% (aq.) potassium hydroxide solution to the resulting residue until it is basic to litmus. Extract the thus-obtained mixture with chloroform, and remove the chloroform from the extract on a rotary evaporator. Chromatgraph the resulting material through silica gel to obtain 4-bromo-α-2-piperidyl-α-morpholinomethyl benzyl alcohol as the free base.

Dissolve the free base in a mixture of diethyl ether and chloroform, cool the resulting solution to 0°, and pass through said cooled solution a stream of hydrogen chloride gas. Crystallize the resulting salt from methanol-ether to obtain 4-bromo-α-2-piperidyl-α-morpholinomethyl benzyl alcohol dihydrochloride, M.P. 293° to 295°.

EXAMPLE 30

2,5-dichloro-α-2-piperidyl-α-morpholinomethyl benzyl alcohol

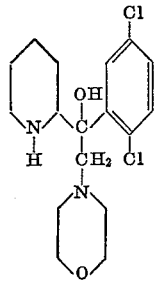

Charge a hydrogenation bottle with 15 parts of 2,5-dichloro-α-2-pyridyl-α-morpholinomethyl benzyl alcohol, 100 parts by volume of acetic acid and 0.5 parts of platinum oxide. Place the bottle in a Parr hydrogenation apparatus and adjust the hydrogen pressure to 50 p.s.i.g. When the theoretical amount of hydrogen is absorbed (about 16 hours), filter off the catalyst and evaporate the filtrate on a rotary evaporator. Add 20% (aq.) potassium hydroxide solution to the resulting residue until it is basic to litmus. Extract the thus-obtained mixture with chloroform, and remove the chloroform from the extract on a rotary evaporator. Chromatograph the resulting material through silica gel to obtain 2,5-dichloro-α-2-piperidyl-α-morpholinomethyl benzyl alcohol as the free base.

Dissolve the free base in diethyl ether, cool the resulting solution to 0°, and pass through said cooled solution a stream of hydrogen chloride gas. Crystallize the resulting salt from methanol-ether to obtain 2,5-dichloro-α-2-piperidyl - α - morpholinomethyl benzyl alcohol dihydrochloride, M.P. 253° to 256°.

EXAMPLE 31

3,4-dichloro-α-2-piperidyl-α-morpholinomethyl benzyl alcohol

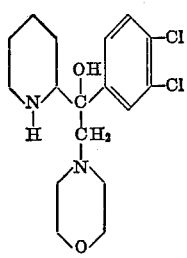

Charge a hydrogenation bottle with 10.6 parts of 3,4-dichloro-α-2-pyridyl-α-morpholinomethyl benzyl alcohol, 100 parts by volume of acetic acid and 0.3 part of platinum oxide. Place the bottle in a Parr hydrogenation apparatus and adjust the hydrogen pressure to 50 p.s.i.g. When the theoretical amount of hydrogen is absorbed (about 16 hours), filter off the catalyst and evaporate the filtrate on a rotary evaporator. Add 20% (aq.) potassium hydroxide solution to the resulting residue until it is basic to litmus. Extract the thus-obtained mixture with chloroform, and remove the chloroform from the extract on a rotary evaporator. Chromatograph the resulting material through silica gel to obtain 3,4-dichloro-α-morpholinomethyl benzyl alcohol as the free base.

Dissolve the free base in diethyl ether, cool the resulting solution to 0°, and pass through said cooled solution a stream of hydrogen chloride gas. Crystallize the resulting salt from methanol-ether to obtain 3,4-dichloro-α-2-piperidyl-α-morpholinomethyl benzyl alcohol dihydrochloride, M.P. 296° to 298°.

EXAMPLE 32

4-methyl-α-2-piperidyl-α-(N-methyl-N-cyclohexyl-aminomethyl)-benzyl alcohol

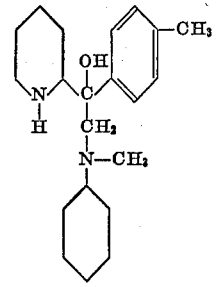

Charge a hydrogenation bottle with 11.5 parts of 4-methyl-α-2-piperidyl-α-N-methylanilinomethyl benzyl alcohol, 100 parts by volume of acetic acid and 0.35 part of platinum oxide. Place the bottle in a Parr hydrogenation apparatus and adjust the hydrogen pressure to 50 p.s.i.g. When the theoretical amount of hydrogen is absorbed (about 12 hours), filter off the catalyst and evaporate the filtrate on a rotary evaporator. Add 20% (aq.) potassium hydroxide solution to the resulting residue until it is basic to litmus. Extract the thus-obtained mixture with chloroform, and remove the chloroform from the extract on a rotary evaporator. Chromatograph the resulting material through silica gel to obtain 4-methyl-α-2-piperidyl - α - (N - methyl - N - cyclohexylaminomethyl)-benzyl alcohol as the free base.

Dissolve the free base in diethyl ether, cool the resulting solution to 0°, and pass through said cooled solution of stream aof hydrogen chloride gas. Crystallize the resulting salt from methanol-ether to obtain 4-methyl-α-2 - piperidyl - α - (N - methyl - N - cyclohexylaminomethyl)-benzyl alcohol dihydrochloride, M.P. 244° to 245°.

EXAMPLE 33

α-(2-N-methylpiperidyl)-α-morpholinomethyl benzyl alcohol

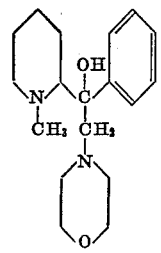

Charge a hydrogenation bottle with 6.4 parts of α-2-pyridyl-α-morpholinomethyl benzyl alcohol, 3.1 parts of 37% formalin, 50 parts by volume of isopropanol and 1.0 part of 10% palladium-carbon. Place the bottle in a Parr hydrogenation apparatus and adjust the hydrogen pressure to 50 p.s.i.g. When the theoretical amount of hydrogen is absorbed (about 16 hours), filter off the catalyst and remove the solvent in vacuo. Chromatograph the thus-obtained material through silica gel to obtain α-(2-N-methylpiperidyl)-α-morpholinomethyl benzyl alcohol as the free base.

Dissolve the free base in a mixture of diethyl ether and dichloromethane, cool the resulting solution to 0°, and pass through said cooled solution a stream of hydrogen chloride gas to obtain α-(2-N-methylpiperidyl)-α-morpholinomethyl benzyl alcohol dihydrochloride, M.P. 185°.

What is claimed is:
1. A compound selected from the group consisting of free bases having one of the formulae

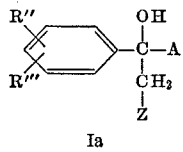

Ia and

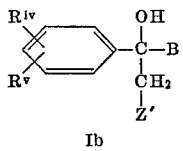

Ib and pharmaceutically acceptable acid addition and quaternary salts thereof, wherein A represents

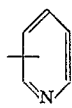

B represents

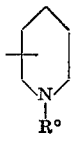

Z and Z' each represents

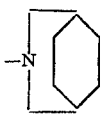

or a saturated monocyclic ring

consisting of, in the ring, in addition to the nitrogen atom; from 4 to 6 carbon atoms or 4 carbon atoms and one additional hetero atom of the group nitrogen and oxygen; R° represents hydrogen or methyl; R represents alkyl consisting of 1–4 carbon atoms; $R^1$ represents alkyl consisting of 1–4 carbon atoms; or unsubstituted lower cyclo [lower] alkyl; R" and R'" each represent hydrogen, straight-chain alkyl consisting of 1–4 carbon atoms, straight-chain alkoxy consisting of 1–4 carbon atoms, halogen having an atomic weight no greater than 80, trifluoromethyl or nitro; provided than when R" or R'" is other than hydrogen it is in one of the positions 2-, 3-, 4- and 5-; and $R^{iv}$ and $R^v$ each represent hydrogen, straight-chain alkyl consisting of 1–4 carbon atoms, straight-chain alkoxy consisting of 1–4 carbon atoms, halogen having an atomic weight no greater than 80, or trifluoromethyl; provided that when $R^{iv}$ or $R^v$ is other than hydrogen it is in one of the position 2-, 3-, 4- and 5.

2. The compound of claim 1 which is 4-methoxy-α-2-piperidyl-1α-morpholinomethyl benzyl alcohol.

3. The compound of claim 1 which as 3-trifluoromethyl-α-2-piperidyl-α-morpholinomethyl benzyl alcohol.

4. The compound of claim 1 which is 4-chloro-α-2-piperidyl-α-morpholinomethyl benzyl alcohol.

5. The compound of claim 1 which is α-2-piperidyl-α-morpholinomethyl benzyl alcohol.

6. The compound of claim 1 which is 3-(2-hydroxy-2-phenyl-2-α-piperidylethyl)-3-azabicyclo [3.2.2]nonane.

No reference cited.

ALEX MAZEL, Primary Examiner

J. TVAR, Assistant Examiner

U.S. Cl. X.R.

260—247.1, 247.2, 268, 293.2 293.4, 294, 294.7, 294.8, 295, 295.5, 296; 424—248, 250, 263, 267